(12) United States Patent
Wang et al.

(10) Patent No.: US 10,436,164 B2
(45) Date of Patent: Oct. 8, 2019

(54) TAPPET ROLLER RETAINING APPROACH

(71) Applicant: CUMMINS INC., Columbus, IN (US)

(72) Inventors: Chin-pei Wang, Greenwood, IN (US); Matthew B. State, Indianapolis, IN (US); Eric A. Benham, Columbus, IN (US); Justin Gregory Wenger, Carmel, IN (US); Alexander E. Lesin, Columbus, IN (US); Kyle J. Brewer, Sellersburg, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 15/539,618

(22) PCT Filed: Dec. 23, 2014

(86) PCT No.: PCT/US2014/072032
§ 371 (c)(1),
(2) Date: Jun. 23, 2017

(87) PCT Pub. No.: WO2016/105355
PCT Pub. Date: Jun. 30, 2016

(65) Prior Publication Data
US 2018/0266374 A1    Sep. 20, 2018

(51) Int. Cl.
*F02M 59/10* (2006.01)
*F02M 59/44* (2006.01)
(Continued)

(52) U.S. Cl.
CPC .......... *F02M 59/102* (2013.01); *F02M 59/44* (2013.01); *F04B 1/0426* (2013.01);
(Continued)

(58) Field of Classification Search
CPC ............... F02M 59/102; F02M 59/44; F02M 2200/8061; F04B 1/0426; F04B 9/04; F04B 9/042
(Continued)

(56) References Cited

U.S. PATENT DOCUMENTS 4,754,737 A * 7/1988 Ishida ................. F02D 1/12
123/357
5,318,001 A    6/1994 Djordjevic
(Continued)

FOREIGN PATENT DOCUMENTS

CN    102472218 A    5/2012
CN    103958879 A    7/2014
(Continued)

OTHER PUBLICATIONS

International Search Report and Written Opinion dated Apr. 17, 2015 in PCT/US2014/072032.

*Primary Examiner* — Mahmoud Gimie
(74) *Attorney, Agent, or Firm* — Faegre Baker Daniels LLP

(57) ABSTRACT

A roller assembly, comprising a roller shoe having a bottom surface, and a groove at the bottom surface, the groove having a semicircular portion and a straight portion extending from the semicircular portion, the semicircular portion having a first diameter and the straight portion having a first width, and a cylindrical roller positioned in the roller shoe groove, the cylindrical roller having a second diameter, wherein the first width is greater than or equal to the first diameter and the second diameter is less than the first width.

20 Claims, 4 Drawing Sheets

(51) Int. Cl.
*F04B 9/04* (2006.01)
*F04B 1/04* (2006.01)

(52) U.S. Cl.
CPC ............... *F04B 9/04* (2013.01); *F04B 9/042* (2013.01); *F02M 2200/8061* (2013.01)

(58) Field of Classification Search
USPC ........................................................ 123/508
See application file for complete search history.

(56) References Cited

U.S. PATENT DOCUMENTS

| | | |
|---|---|---|
| 7,509,947 B2 | 3/2009 | Tansug et al. |
| 8,011,349 B2 | 9/2011 | Felton |
| 8,967,037 B2 | 3/2015 | Jones et al. |
| 2013/0104730 A1 | 5/2013 | Maier |
| 2013/0206112 A1 | 8/2013 | Tamai et al. |
| 2014/0216203 A1 | 8/2014 | Takamizawa |

FOREIGN PATENT DOCUMENTS

| | | | | |
|---|---|---|---|---|
| DE | 19501060 A1 | | 7/1996 | |
| DE | 102009001108 A1 | * | 8/2010 | ........... F02M 59/102 |
| DE | 102009047568 A1 | | 6/2011 | |
| DE | 102010039113 A1 | * | 2/2012 | ........... F02M 59/102 |
| JP | 2014152667 A | * | 8/2014 | ........... F02M 59/102 |
| WO | WO 2011018259 A1 | * | 2/2011 | ........... F02M 59/102 |

\* cited by examiner

TAPPET ROLLER RETAINING APPROACH

CROSS-REFERENCE TO RELATED APPLICATIONS

This application is a national phase filing of PCT International Application Serial No. PCT/US2014/072032, filed Dec. 23, 2014, the disclosure of which is expressly incorporated herein by reference.

TECHNICAL FIELD

The present disclosure relates generally to high pressure fuel pumps for supplying fuel to internal combustion engines, and more specifically, to high pressure fuel pumps having a roller assembly with a low manufacturing cost.

BACKGROUND

Generally, a roller assembly cooperates with a cam through which the high pressure fuel pump is driven mechanically. In conventional high pressure fuel pumps, a roller shoe has a groove, essentially of a circular arc, for retaining a roller. Due to complex dimensional requirements of various parts of the roller assembly (e.g., the groove shape, the related shape of the roller, and the periphery shape of the roller shoe), the over-all manufacturing cost of the roller assembly is high. Thus, there remains a need in the art for a roller assembly for converting rotational movement into reciprocal movement which reduces over-all manufacturing cost.

SUMMARY

In one embodiment, the present disclosure provides a roller assembly comprising, a roller shoe having a bottom surface, and a groove at the bottom surface, the groove having a semicircular portion and a straight portion extending from the semicircular portion, the semicircular portion having a first diameter and the straight portion having a first width, and a cylindrical roller positioned in the roller shoe groove, the cylindrical roller having a second diameter, wherein the first width is greater than or equal to the first diameter and the second diameter is less than the first width. According to one aspect of this embodiment, the roller shoe further includes a first portion at a distal end, a second portion at a proximal end, and an annulus undercut extending from the first portion to the second portion. In another aspect of this embodiment, the groove extends through the first portion and the annulus undercut. In yet another aspect of this embodiment, a center of the semicircular portion is located nearer to the proximal end than the first portion. Another aspect of this embodiment further including a tappet body having a distal end and an inner bore, the roller shoe being press-fit into the distal end of the tappet body. In yet another aspect of this embodiment, the inner bore has a third diameter that is smaller than an outer diameter of the first portion and an outer diameter of the second portion, and one of smaller than and equal to an outer diameter of the annulus undercut.

In another embodiment of the present disclosure, a method comprising, inserting a cylindrical roller in a roller shoe, positioning the cylindrical roller into a tappet body, generating a radial force at an interface between a first portion of the cylindrical roller and an inner bore of the tappet body in response to positioning the cylindrical roller into a tappet body, deforming a groove in the cylindrical roller in response to the radial force generated at the interface between the first portion of the cylindrical roller and the inner bore of the tappet body, retaining the roller shoe in the cylindrical roller in response to deforming the groove, and retaining the roller shoe in a fully inserted position with the cylindrical roller protruding. According to one aspect of this embodiment, deforming is controlled at the interface between a first portion of the cylindrical roller and the inner bore of the tappet body.

In one embodiment, the present disclosure provides an article of manufacture comprising, a roller shoe having a bottom surface, and a groove at the bottom surface, the groove having a semicircular portion and a straight portion extending from the semicircular portion, the semicircular portion having a first diameter and the straight portion having a first width, and a cylindrical roller positioned in the roller shoe groove, the cylindrical roller having a second diameter, wherein the first width is greater than or equal to the first diameter and the second diameter is less than the first width. According to one aspect of this embodiment, the roller shoe further includes a first portion at a distal end, a second portion at a proximal end, and an annulus undercut extending from the first portion to the second portion. In another aspect of this embodiment, the groove extends through the first portion and the annulus undercut. In yet another aspect of this embodiment, a center of the semicircular portion is located nearer to the proximal end than the first portion. Another aspect of this embodiment further including a tappet body having a distal end and an inner bore, the roller shoe being press-fit into the distal end of the tappet body. In yet another aspect of this embodiment, the inner bore has a third diameter that is smaller than an outer diameter of the first portion and an outer diameter of the second portion, and one of smaller than and equal to an outer diameter of the annulus undercut.

In yet another embodiment of the present disclosure, a high pressure fuel pump system comprising, a pump housing having a bore, a plunger slidably disposed in the bore, a cam, a tappet body, and a roller assembly disposed in the tappet body between the plunger and the cam, wherein the roller assembly includes a roller shoe having a bottom surface, and a groove at the bottom surface, the groove having a semicircular portion and a straight portion extending from the semicircular portion, the semicircular portion having a first diameter and the straight portion having a first width, and a cylindrical roller slidably disposed in the roller shoe groove, the cylindrical roller having a second diameter, wherein the first width is greater than or equal to the first diameter and the second diameter is less than the first width. According to one aspect of the embodiment, the roller assembly is configured to convert rotational movement of the cam into reciprocal movement of the plunger.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1:
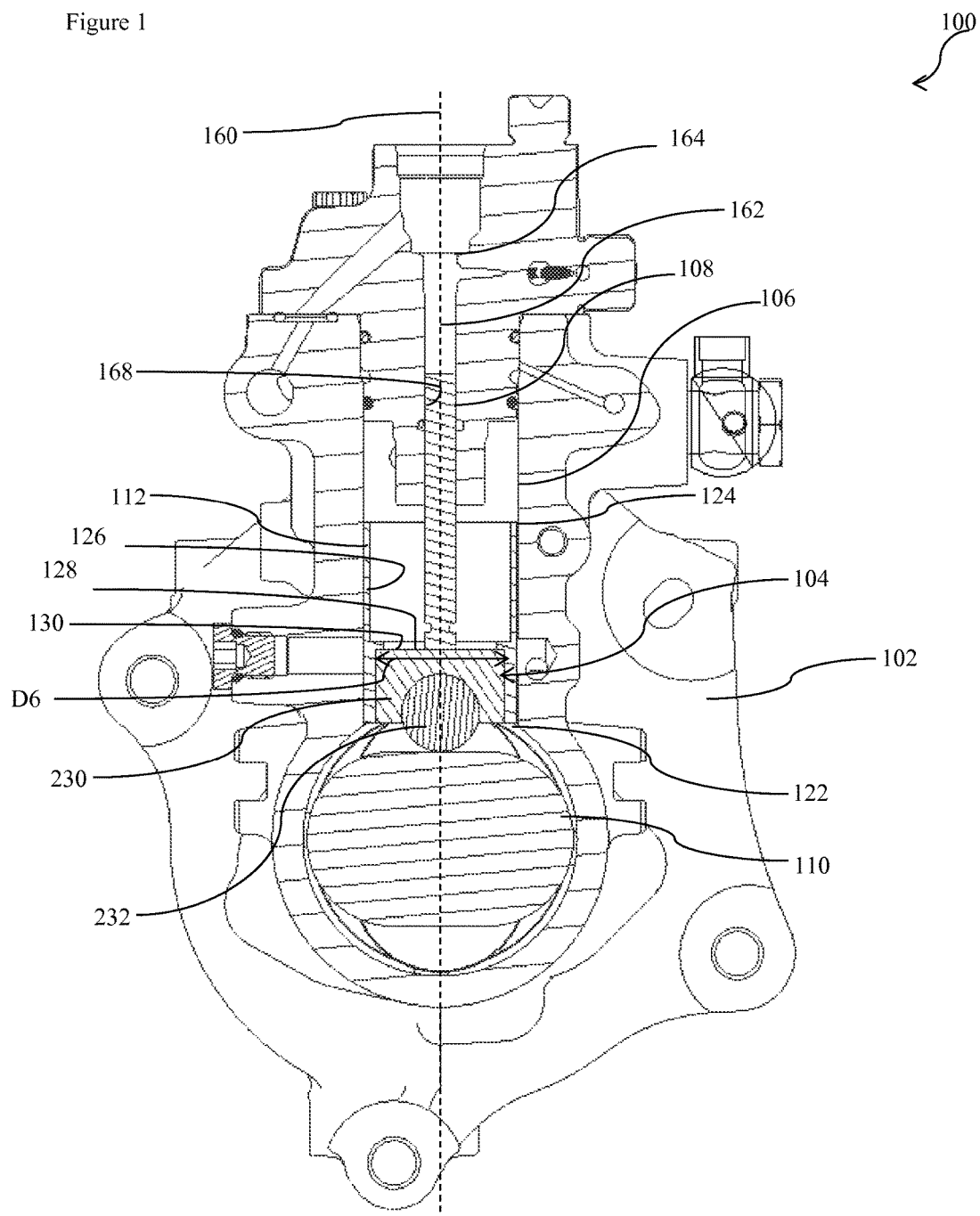
FIG. 1 is a sectional, side view showing a high pressure fuel pump in which a roller assembly can be implemented according to present disclosure.

Although the drawings represent embodiments of the various features and components according to the present disclosure, the drawings are not necessarily to scale and certain features may be exaggerated in order to better illustrate and explain the present disclosure. The exemplification set out herein illustrates embodiments of the disclosure, and such exemplifications are not to be construed as limiting the scope of the disclosure in any manner.

DETAILED DESCRIPTION OF EMBODIMENTS

For the purpose of promoting an understanding of the principles of the disclosure, reference will now be made to the embodiments illustrated in the drawings, which are described below. It will nevertheless be understood that no limitation of the scope of the disclosure is thereby intended. The disclosure includes any alterations and further modifications in the illustrated device and described methods and further applications of the principles of the disclosure, which would normally occur to one skilled in the art to which the disclosure relates. Moreover, the embodiments were selected for description to enable one of ordinary skill in the art to practice the disclosure.

Referring to FIG. 1, a high pressure fuel pump 100 is depicted as having a pump housing 102, a roller assembly 104, an inner bore 106, a plunger 108, a cam 110, and a tappet body 112. Pump housing 102 defines inner bore 106 within which plunger 108 is mounted for reciprocal movement through compression and retraction strokes, under influence of an engine driven cam arrangement (not shown). Pump housing 102 further includes a longitudinal axis 160. Inner bore 106 is generally cylindrical having a longitudinal axis coaxial with the longitudinal axis 160 of the pump housing 102. Inner bore 106 includes a pumping bore 168, which extends longitudinally into pump housing 102. A pumping chamber 162 is formed into pumping bore 168 between a proximal end of plunger 108 and a distal side of an inlet disc 164 within which fuel is pressurized to a relatively high level as plunger 108 is driven by the engine (not shown). Pump housing 102 and associated components may be constructed of any material that can withstand the pressures and heat of fluids processed therethrough. For example, heat treated steel is a suitable material. Plunger 108 has an outer diameter which is smaller than an inner diameter of pumping bore 168 to form an annular clearance that permits reciprocal movement of plunger 108 within pumping bore 168 while creating a partial fluid seal. Plunger 108 is driven by a rotating cam 110 and roller assembly 104. Tappet body 112 is generally cylindrical having a distal end 122 and a proximal end 124, and a bore 126 extents longitudinally from distal end 122 to proximal end 124. Tappet body 112 has an inner diameter at D6 distal end 112. Plunger 108 is disposed at proximal end 124 of tappet body 112 and roller assembly 104 is disposed at distal end 122 of the tappet body 112, such that a lower surface 128 of plunger 108 and an upper surface 130 of roller assembly contacts one another. Roller assembly 104 is positioned between cam 110 and plunger 108, such that rotational movement of cam 110 is converted to reciprocal movement of plunger 108.

Figure 2A:
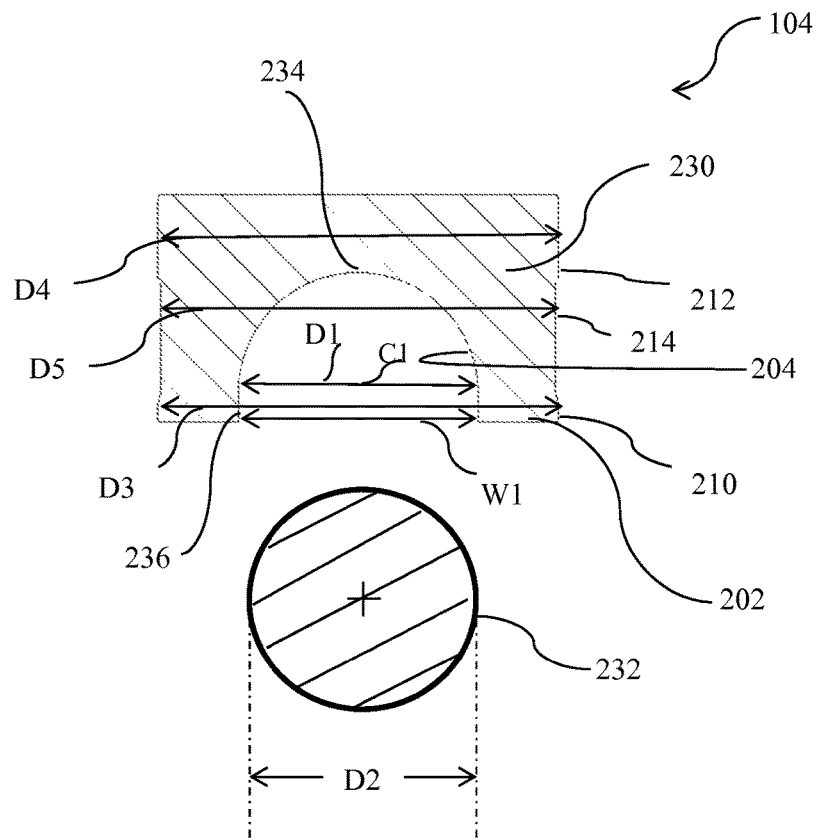
FIG. 2A is a view of the roller assembly of FIG. 1.

Referring now to FIG. 2A, roller assembly 104 is depicted having a roller shoe 230, and a roller 232. Roller 232 is may be generally cylindrical in shape. Roller shoe 230 has a first portion 210 with a bottom surface 202 (distal end), and a second portion 212 with an upper surface 130 (proximal end) and an annulus undercut 214 therebetween. First portion 210 has an outer diameter D3, which is larger than the outer diameter D5 of annulus undercut 214. Similarly, second portion 212 has an outer diameter D4 which is greater than outer diameter D5 of the annulus undercut 214. Bottom surface 202 of roller shoe 230 further includes a groove 204 for retaining roller 232. Groove 204 has two portions: a semicircular portion 234 having a center C1, and first diameter D1, and a straight portion 236 having a first width W1, such that first diameter D1 of semicircular portion 234 is equal to the first width W1 of the straight portion 236 of the groove 204. First portion 210 is located below the center C1 of semicircular portion 234 of the groove 204.

Figure 2B:
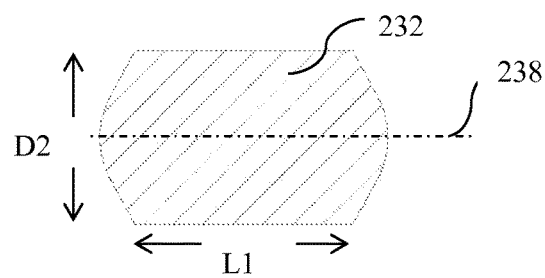
FIG. 2B is a side view of an exemplary roller of the roller assembly of FIG. 2.
Figure 2C:
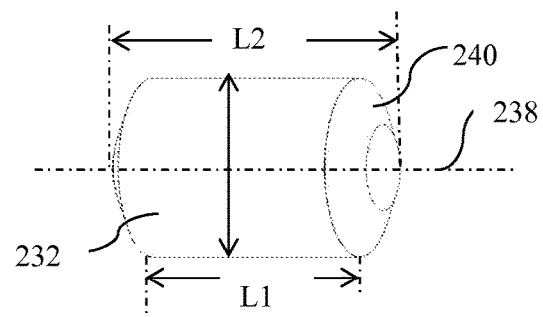
FIG. 2C is a side view of an exemplary roller of the roller assembly of FIG. 2.

Now referring to FIG. 2B, a roller 232 is depicted. Roller 232 may be generally cylindrical in shape having a longitudinal length L1, a second diameter D2, and a longitudinal axis 238 which is perpendicular to the longitudinal axis 160 of pump housing 102. The second diameter D2 of roller 232 is slightly smaller than first diameter D1 and first width W1, such that roller 232 has sufficient running clearance when roller 232 is inserted into groove 204 of roller shoe 230. Length L1 of roller 232 is smaller than the inner diameter D6 of tappet body 112. In one embodiment, roller 232 may have a conical protrusion on surface 240 (FIG. 2C) increasing the overall length of roller 232 to L2, which is greater than length L1 and smaller than inner diameter of tappet body 112 (as shown in FIG. 2C).

Now referring back to FIG. 1, roller 232 further contacts cam 110 and rotatory movement of cam 110 causes roller 232 to rotate about its axis through contact with cam 110, and cause roller assembly 104 to move longitudinally relative to longitudinal axis 160. As roller assembly 104 moves longitudinally away from a longitudinal axis 238 of roller 232, it contacts and moves plunger 108 along longitudinal axis 160. Longitudinal movement of plunger 108 away from the longitudinal axis of 238 of roller 232 causes compression or pressurization of fuel in pumping chamber 162, and creates a pressure stroke, and longitudinal movement of plunger 108 toward the longitudinal axis 238 of roller 232 draws fuel into pumping chamber 162, and creates an intake stroke.

Figure 3A:
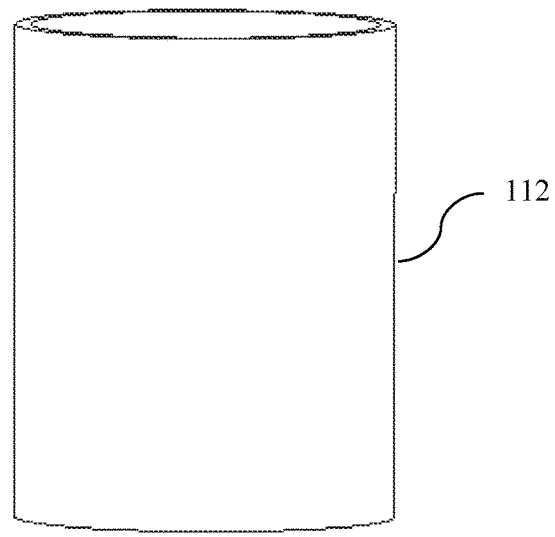
FIG. 3A is a side view showing a tappet body in which the roller assembly of FIG. 1 can be implemented.
Figure 3A:
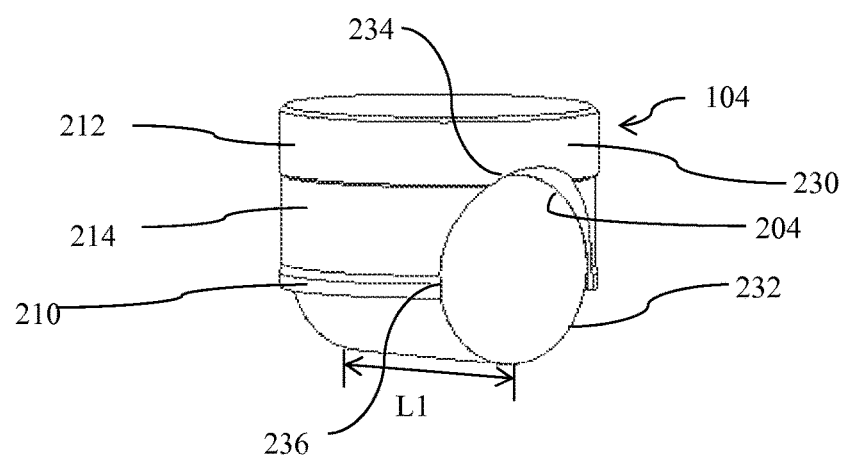

Now referring to FIG. 3A, roller assembly 104 with tappet body 112 is depicted. Roller 232 is inserted into groove 204 of the roller shoe 230. Since second diameter D2 of roller 232 is slightly smaller than first width W1 of straight portion 236 and first diameter D1 of semicircular portion 234 of groove 204, roller 232 slides into groove 204 with a portion protruding from the distal end of the roller shoe 230. Roller shoe 230 is then inserted into the tappet body 112, such that a portion of roller 232 still protrudes from the distal end of tappet body 112, which is in contact with cam 116 (as shown in FIG. 3A).

Figure 3B:
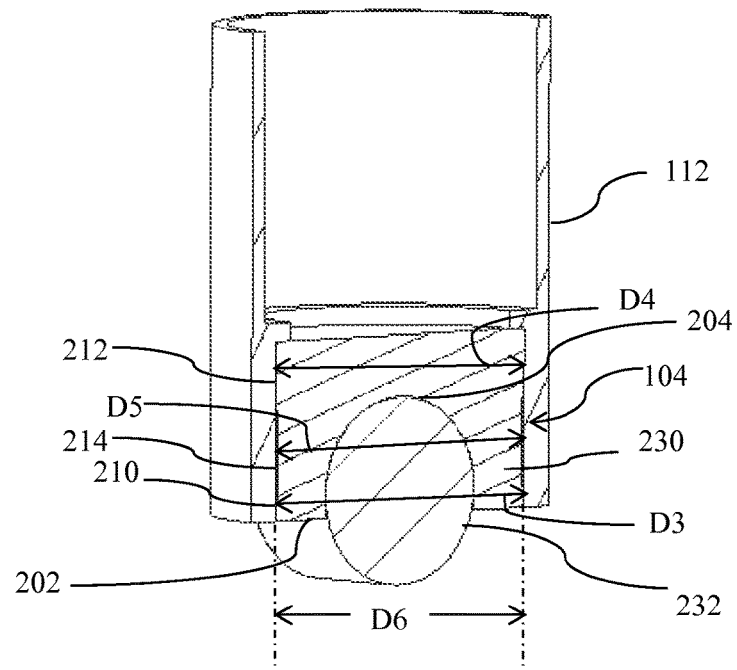
FIG. 3B is a sectional side view showing a tappet body having the roller assembly retained therein.
Figure 3C:
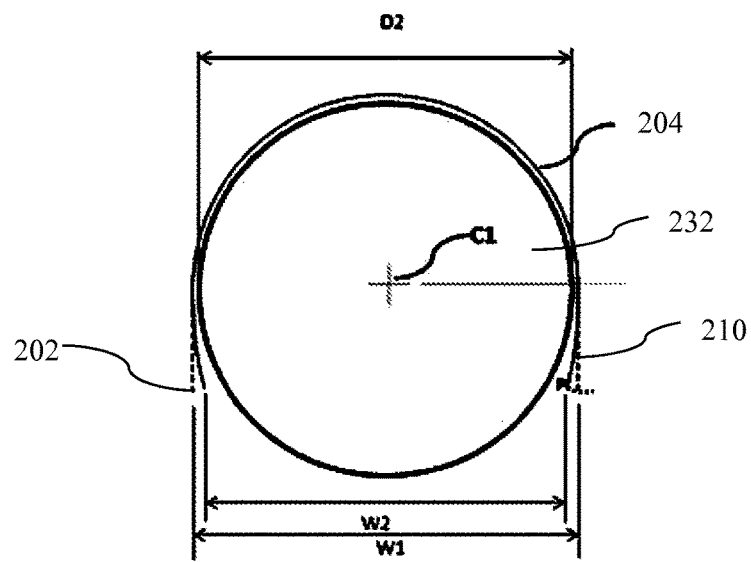
FIG. 3C is a front view of a roller and a deformed roller groove.

Now referring to FIG. 3B, a deformed groove 204 is depicted. Roller assembly 104 is forced into tappet body 112 using any known processes, for example, an interference fit process. Interference between roller assembly 104 and tappet body 112 is achieved at the first portion 210 and second portion 212, since the inner diameter D6 of tappet body 112 is smaller than the outer diameter D3 of first portion 210, and outer diameter D4 of second portion 212. However, very slight or no interference exists between inner surface of tappet body 112 and annulus undercut 214, which slides smoothly into tappet body 112 as the outer diameter D5 of annulus undercut 214 is equal to or smaller than the inner diameter D6 of tappet body 112. The amount of interference may be such that roller 232 has sufficient running clearance for rotation, but is prevented from falling out of the roller assembly 104. The interference may be created via force: press-fit, or any similar process. Press-fit may be achieved with presses that can press roller assembly 104 and tappet body 112 together, at two positions: at interface of first portion 210, and at interface of second portion 212. The amount of force being applied should be sufficient such that roller 232 does not fall out of roller assembly 104 while still having sufficient running clearance for rotation. Such presses may be hydraulic: hand-operated such as arbor presses, or automatic. As roller assembly 104 is forced into tappet body 112, a radial force deforms first portion 210 since inner diameter D6 of tappet body 112 is smaller than outer diameter D3 of first portion 210. Similarly, radial force deforms second portion 212 since inner diameter D6 of tappet body 112 is smaller than outer diameter D4 of second portion 212. However, annulus undercut 214 slides smoothly into tappet body 112 and remains undeformed/unaffected as inner diameter D6 of tappet body 112 is larger or equal to outer diameter D5 of annulus undercut 214. As the radial force deforms first portion 210, straight portion 236 (FIG. 2A) of the groove 204 is also deformed, pushing two ends of groove 204 towards one another and decreasing first width W1 to width W2 (as shown in FIG. 3C), such that second diameter D2 of roller 232 is greater than deformed width W2 of straight portion 236 of groove 204. As a result of this deformation of bottom surface 202, roller 232 is retained into roller shoe 230. However, groove 204 is deformed only to the extent that roller 232 still has sufficient running clearance. The semicircular portion 234 (FIG. 2A) of groove 204 remains unaffected since it is substantially located in the annulus undercut 214, which also remains unaffected as outer diameter D5 of annulus undercut 214 is one of either smaller than or equal to the inner diameter D6 of the tappet body 112.

It should be understood that while roller assembly 104 is described as being installed in high pressure fuel pump 100, in certain embodiments, the roller assembly 104, with or without tappet body 112, may be used in other apparatuses to convert rotational movement of a cam (or other similar component) into reciprocal movement of a plunger (or other similar component).

While the embodiments have been described as having exemplary designs, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

The invention claimed is:

1. A roller assembly, comprising:
   a roller shoe having a bottom surface, and a groove at the bottom surface, the groove having a semicircular portion and a straight portion extending from the semicircular portion, the semicircular portion having a first diameter and the straight portion having a first width;
   wherein the roller shoe further includes a first portion at a distal end, a second portion at a proximal end, and an annulus undercut extending from the first portion to the second portion; and
   a cylindrical roller positioned in the roller shoe groove, the cylindrical roller having a second diameter;
   wherein the first width is greater than or equal to the first diameter and the second diameter is less than the first width.

2. The roller assembly of claim 1, wherein the groove extends through the first portion and the annulus undercut.

3. The roller assembly of claim 2, wherein a center of the semicircular portion is located nearer to the proximal end than the first portion.

4. The roller assembly of claim 1, further including a tappet body having a distal end and an inner bore, the roller shoe being press-fit into the distal end of the tappet body.

5. The roller assembly of claim 4, wherein the inner bore has a third diameter that is smaller than an outer diameter of the first portion and an outer diameter of the second portion, and one of smaller than and equal to an outer diameter of the annulus undercut.

6. The roller assembly of claim 5, wherein when the roller shoe is press-fit into the distal end of the tappet body, the deformable groove deforms and the straight portion has a second width that is less than the second diameter and the cylindrical roller is retained in the deformable groove.

7. A method, comprising:
   inserting a cylindrical roller in a roller shoe;
   positioning the cylindrical roller into a tappet body;
   generating a radial force at an interface between a first portion of the roller shoe and an inner bore of the tappet body in response to positioning the roller shoe into a tappet body;
   deforming a groove in the roller shoe in response to the radial force generated at the interface between the first portion of the roller shoe and the inner bore of the tappet body;
   retaining the roller in the roller shoe in response to deforming the groove; and
   retaining the roller shoe in a fully inserted position with the roller protruding.

8. The method of claim 7, wherein deforming is controlled at the interface between a first portion of the roller and the inner bore of the tappet body.

9. The method of claim 7, wherein the deformable groove includes a semicircular portion and a straight portion extending from the semicircular portion, the semicircular portion having a first diameter and the straight portion having a first width;
   wherein the cylindrical roller having a second diameter; and
   wherein the first width is greater than or equal to the first diameter and the second diameter is less than the first width.

10. The method of claim 9, wherein when deforming the deformable groove, the straight portion has a second width that is less than the second diameter.

11. An article of manufacture, comprising:
   a roller shoe having a bottom surface, and a deformable groove formed in the bottom surface, the deformable groove having a semicircular portion and a straight portion extending from the semicircular portion, the semicircular portion having a first diameter and the straight portion having a first width; and
   a cylindrical roller positioned in the deformable groove, the cylindrical roller having a second diameter;
   wherein the first width is greater than or equal to the first diameter and the second diameter is less than the first width.

12. The article of manufacture of claim 11, wherein the roller shoe further includes a first portion at a distal end, a second portion at a proximal end, and an annulus undercut extending from the first portion to the second portion.

13. The article of manufacture of claim 12, wherein the groove extends through the first portion and the annulus undercut.

14. The article of manufacture of claim 13, wherein a center of the semicircular portion is located nearer to the proximal end than the first portion.

15. The article of manufacture of claim 11, further including a tappet body having a distal end, a proximal end, and an inner bore, the roller shoe being press-fit into the distal end of the tappet body.

16. The article of manufacture of claim 15, wherein the inner bore has a third diameter that is smaller than an outer diameter of the first portion and an outer diameter of the second portion, and one of smaller than and equal to an outer diameter of the annulus undercut.

17. The article of manufacture of claim 16, wherein when the roller shoe is press-fit into the distal end of the tappet body, the deformable groove deforms and the straight portion has a second width that is less than the second diameter and the cylindrical roller is retained in the roller shoe.

18. A high pressure fuel pump system, comprising:
a pump housing having a bore;
a plunger slidably disposed in the bore;
a cam;
a tappet body; and
a roller assembly disposed in the tappet body between the plunger and the cam;
wherein the roller assembly includes a roller shoe having a bottom surface, and a deformable groove at the bottom surface, the deformable groove having a semicircular portion and a straight portion extending from the semicircular portion, the semicircular portion having a first diameter and the straight portion having a first width, and a cylindrical roller slidably disposed in the deformable groove, the cylindrical roller having a second diameter, wherein the first width is greater than or equal to the first diameter and the second diameter is less than the first width.

19. The high pressure fuel pump of claim 18, wherein the roller assembly is configured to convert rotational movement of the cam into reciprocal movement of the plunger.

20. The high pressure fuel pump of claim 18, wherein the roller shoe is press-fit into the bore to deform the deformable groove;
wherein when the deformable groove is deformed, the straight portion has a second width that is less than the second diameter and the roller is retained in the roller shoe.

* * * * *